July 3, 1951            R. E. BAILEY            2,558,807
METHOD OF MAKING FLEXIBLE FUEL TANKS
Filed Feb. 24, 1947            2 Sheets-Sheet 1
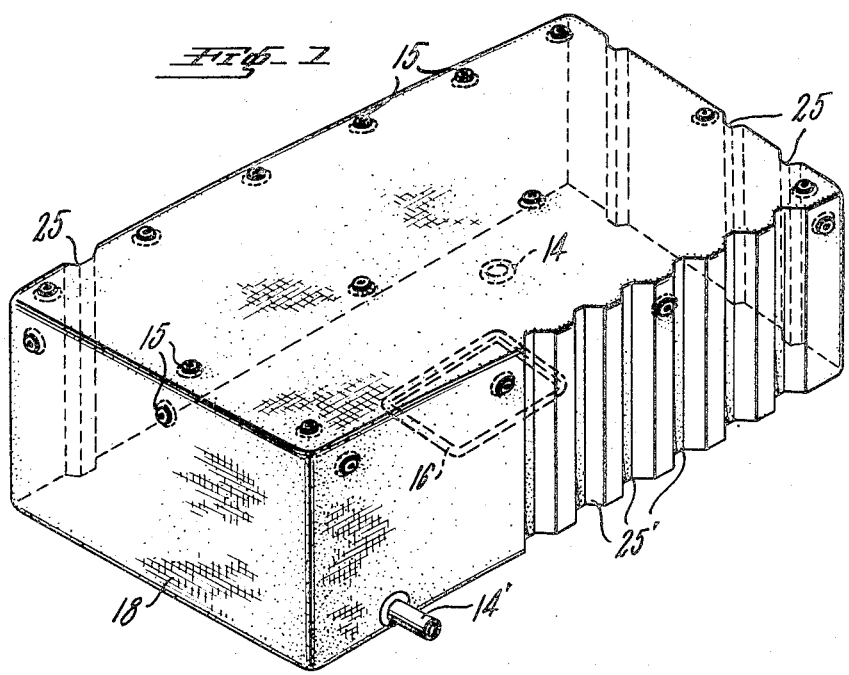
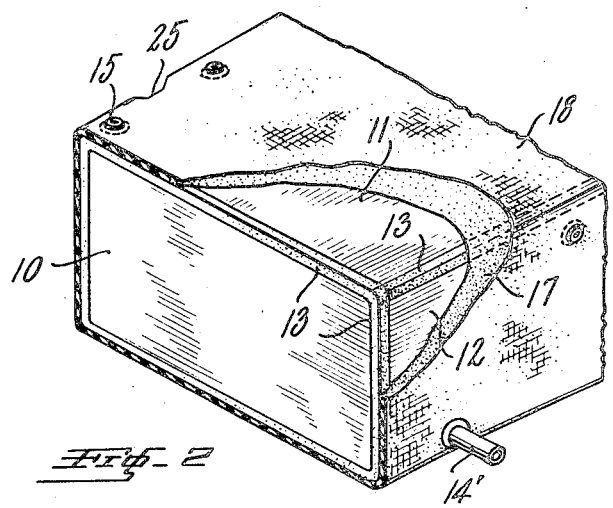
INVENTOR.
ROBERT E. BAILEY
BY
Charles C. Willson
ATTORNEY

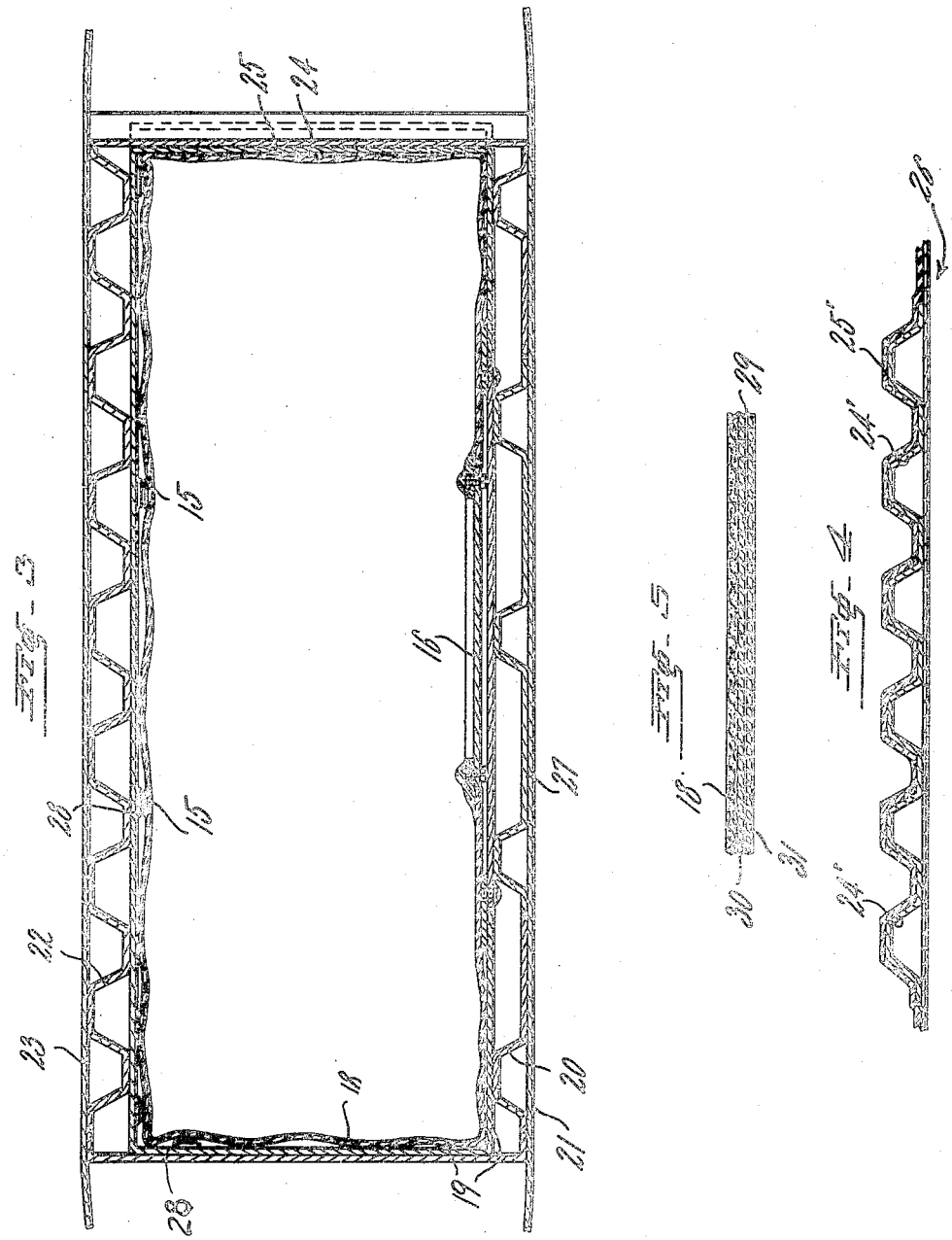

Patented July 3, 1951

2,558,807

UNITED STATES PATENT OFFICE 2,558,807

METHOD OF MAKING FLEXIBLE FUEL TANKS

Robert E. Bailey, Mishawaka, Ind., assignor to United States Rubber Company, New York, N. Y., a corporation of New Jersey Application February 24, 1947, Serial No. 730,647

3 Claims. (Cl. 154—83)

This invention relates to flexible or collapsible fuel tanks of the type that are extensively used in aircraft, and more particularly to the method of making these tanks with a seamless liner.

The present invention is particularly well adapted for use in the manufacture of the so-called bladder type of fuel cell or fuel tank in which the tank is provided with thin highly flexible walls and is intended for use within a rigid supporting chamber that takes the outward expanding pressure when the tank contains fuel. These bladder type fuel tanks are preferably made somewhat larger than the interior of the supporting enclosure to relieve the bladder from strain. The present invention may also be employed to advantage in self-sealing or so-called "bullet-sealing" fuel tanks and in rigid or semirigid tanks.

The bladder type of fuel tank when used in a rigid supporting structure serves to convert a porous rigid cavity into a leak proof tank. In an airplane, for example, cavities exist in the wings and fuselage which may be converted into fuel tanks by inserting flexible bladder or cells therein, substantially as disclosed in the Gray et al. Patent No. 2,102,590. These bladder tanks are subjected to rigorous sloshing and surging of the fuel especially in highly maneuverable, speedy aircrafts. They are also severely distorted during installation and removable through the small openings in the aircraft skin provided to give access to the interior cavity. As a result of these abuses in service, the conventional type of fuel tank liner may separate at the seams, permitting the fuel to escape from the tank. In the case of self-sealing tanks a seam failure allows the fuel to contact the sealing material which immediately begins to swell and finally distintegrates. Pieces that sluff off from the sealant are likely to block the tank outlet, and if this condition is not remedied promptly the tank will be completely destroyed by the action of the fuel.

The flexible types of fuel cell or fuel tank, to which the present invention is directed, were made heretofore by building up the tank layer by layer over a rigid form having the shape it is desired to impart to the interior of the tank being constructed. In making such tanks the practice heretofore was to cut the liner forming sheet material, such as calendered synthetic rubber, to a pattern and then lay it over the form so that the seams overlap, and then carefully adhere these seams together. When, however, a tank has a more or less intricate construction the cutting and fitting of the liner material and forming the seams involve a large amount of tedious work, and it is difficult to make seams which will remain tight throughout the life of the tank.

The present invention contemplates a method whereby the difficulties experienced heretofore with tank liners formed of sheets of calendered stock fitted about the form may be eliminated, and in place thereof fuel tanks may be provided having a liner that is without seams.

This is accomplished in accordance with the present method by providing a form as heretofore made of pasteboard, cardboard or other material which is easily disintegrated, so that it can be removed from the inside of the tank when the work of forming the tank is completed; or, if desired, a more permanent type of form may be used which is made in sections so that it can be collapsed when the time arrives for removing it through an opening in the finished tank. In any case the type of form used should have a smooth exterior surface that is free from cracks or seams of any appreciable size, and when the form is made of pasteboard or the like it is customary to cover the outer surface thereof with a water soluble glue to increase the smoothness of its outer surface. After completion of the tank this glue is dissolved with water to free the tank completely from the form.

After the tank form has been provided and treated with glue as heretofore described it is, in accordance with the method of the present invention, painted or otherwise covered with a number of coats of a fuel resisting rubber or rubberlike cement. When a sufficient number of such coats have been applied to build up the seamless fuel resisting liner to the desired thickness, the liner thus formed which is comparatively tender is protected by applying over the same a lightweight strong woven fabric which is preferably treated with the same type of rubber as was used to make the seamless liner. This protecting and strengthening fabric cover may be applied as heretofore by cutting and fitting the same to the contour of the tank form. After the work of applying this protecting fabric is completed and the various tank fittings have been provided, the tank is vulcanized. The form is then destroyed, if made of paper, by softening it in hot water and is removed through a manhole or other opening in the tank, or the form may be collapsed and removed through such opening if made from a non-destructible material.

While it is deemed preferable to provide the seamless liner with a protecting layer of fabric as just described, this protecting layer may be formed of a tough plastic such for example as nylon (synthetic linear polyamide), and while the protecting layer should enclose the container formed by the seamless liner, it need not in all cases be bonded to the liner.

By employing the method of the present invention it is not only possible to make flexible fuel cells or fuel tanks with seamless liners, but in the case of intricate or oddly shaped tanks which would be very difficult to produce due to the necessity of cutting and fitting a sheet of lining material and closing the numerous seams, these difficulties are avoided. Another advantage resulting from the present invention over the prior art is the elimination of the calendering operation required to produce the sheet material used heretofore to form the tank lining. Furthermore the method contemplated by the present invention is very simple to carry out since the fuel resisting rubber or rubber-like cement which is to be applied to the form in successive coats may be painted or sprayed upon the form or applied thereto by a dipping operation.

The above and other features of the present invention will be further understood from the following description when read in connection with the accompanying drawings illustrating one form of fuel tank constructed in accordance with the present method.

In the drawings:

Fig. 1 is a perspective view of a fuel cell or fuel tank having odd shaped side walls and constructed in accordance with the present method.

Fig. 2 is a perspective end view of the tank of Fig. 1, the end and part of two side walls of the tank being removed to show the form upon which the tank is built.

Fig. 3 is a transverse sectional view through the tank of Fig. 1 shown within a supporting structure of an airplane.

Fig. 4 is a horizontal section taken through the wall of the tank of Fig. 1 and an adjacent bulkhead, after the tank is installed in an airplane; and Fig. 5 is an enlarged sectional view through a small portion of a tank wall of modified construction.

The fuel cell or fuel tank contemplated by the present invention is built up about a form which may be constructed as heretofore and made from cardboard, papier-mâché, plaster or from a combination of these materials, or it may be formed of wood or metal to provide sections that fit neatly together but can be collapsed when the tank is completed, so that the form may be removed through a relatively small opening in the tank. The form used should, as above stated, have smooth outer surfaces and all seams should be closely fitted or carefully closed, because when the film forming rubber or rubber-like material that is to make the seamless liner is applied to the form it will take the impression of any cracks or crevices presented by the form. The form shown in Fig. 2 of the drawing has the end wall 10 and the side walls 11 and 12.

The nature of the liner used in the tank herein contemplated will depend upon the type of fuel which the tank is to confine. For certain types of hydrocarbons such as aliphatic hydrocarbons, Buna N (butadiene-acrylonitrile copolymer rubber) makes a satisfactory liner. The Buna N cement, in accordance with the present invention, is painted or otherwise applied over the form in successive films until a liner of about .005" to .007" thick is produced. The cement when painted on the form tends to run down the vertical edges with the result that it may become too thick near the bottom and too thin along the top of the edges of the form. This difficulty however is overcome by applying to each edge of the form, after the glue has been applied and dried, a thin narrow tape of Buna N made from a highly plasticized modification of the vulcanizable compound. This tape need not be more than about one-half inch wide and about .010" to .014" thick and is applied so that its center line falls on the edge, and the tape extends for one-fourth of an inch over each of the surfaces forming the edge. The glue of the form is made tacky by wiping over it with a damp cloth just before the tape is applied so that the tape adheres to the form. During the vulcanizing operation which is carried out under pressure this tape will blend into the film of the seamless liner to provide a smooth surface at the inside of the tank, but which is slightly increased in thickness along the edges of the tank. These tapes are indicated by 13 in Fig. 2 of the drawing and they are preferably made from a compound that contains considerably more plasticizer than the lining stock.

It is desirable to provide the fuel tank with various types of fitting such for example as an outlet 14, interconnector 14', various snap fastenings 15 that are provided to secure the collapsible tank to the surrounding metal structure, and the relatively large opening 16 through which the collapsible form may be removed and a workman may also reach into the interior of the tank. The points at which such tank fittings are to be placed are marked on the outer surface of the form, then gaskets of Buna N rubber that have been die cut to the required size are adhered to the form at the marked locations. These gaskets are made from vulcanizable stock and are applied in the same manner as the edge tape 13. The fittings usually used are of the compression type, consisting of two rigid rings usually made of aluminum clamped together with the tank wall therebetween. The rubber gaskets when vulcanized act as a cushion to seal the joints between the rings and prevent leakage at this point. In certain instances it may be desirable to use molded rubber fittings like nipple interconnector fittings. These fittings are fixed on bosses which are accurately located upon the form and project therefrom.

After all edges of the form have been taped as indicated at 13 and the gaskets and molded fittings have been secured to the walls of the form at the proper points, a cement prepared from fuel resisting material such as a Buna N compound is applied to the form. This compound is dispersed in a suitable solvent such as methyl ethyl ketone or diethylene chloride (18–20% solids) and is brushed over the surface of the form. The cement dries rapidly as the solvent evaporates, leaving a smooth film on the surface of the form. Successive coats are applied, each one depositing a rubber layer about .001" in thickness until a seamless liner 17 about .005" to .007" thick is produced. The tape 13 along the edges of the form assures a proper thickness of the liner at such edges, and lessens the tendency of the cement to run down such edges. Without such tapes the cement will tend to run down the vertical edges leaving an inadequate deposit and build up in "tear drop" effect, which is undesirable because of the irregularity in thickness. If the tape is not used, several additional coats of cement must be applied to the edges only to build up a film in these areas before the cement is applied over the entire form. Care must be exercised in applying the cement over the edges of the tapes, gaskets, and molded fitting flanges so that the film is deposited on the form immediately adjacent to the raised rubber part. The cement film tends to "bridge over" from the form surface to higher surface of the tape, gasket or flange, to leave an air pocket between the form and the film around the edge of the raised part.

It has been found that films deposited in the manner just described sometimes contain minute "pin holes." To guard against the danger of fuel such as highly volatile gasoline passing through the microscopic holes, a sealing coat of bonding cement containing an equal part by weight of phenol-formaldehyde resin and Buna N rubber is spread over the Buna N film, after the first few layers of the latter film have been applied. This resin containing film has the property of filling in the "pin holes," whereupon subsequent coats of the Buna N cement are applied until a seamless liner of the desired thickness is produced.

After the required number of coats have been applied to form the seamless liner 17, usually about 8 to 10 coats including the resin containing sealing coat, this liner is covered with a strong lightweight woven fabric 18, or if preferred with a strong protecting layer of some other material such for example as nylon or polyvinyl chloride. The fabric 18 before it is applied over the liner is impregnated with rubber of the same type as that used in forming the liner 17, and the rubber may be applied to the fabric by a spreading operation or by a calendering operation. The coated fabric 18 is cut to fit the form and the component pieces are spliced together with a Buna N adhesive, similar to the practice that was followed in making collapsible fuel tanks prior to the present invention. The protecting layer 18 of fabric or other material need not in all cases be bonded to the liner 17.

The unvulcanized cell or tank 17, 18 with the form therein is placed in a pressure vulcanizer where the Buna N rubber compounds and adhesives used in fabricating the tank are vulcanized. Steam or air may be used at pressures sufficient to mold the plies together and cause the edge tapes 13 and gasket rings to flow into the cement liner 17; about 50 pounds to the square inch pressure is used during the vulcanizing operation.

The form, if of paper, is then soaked in water to soften or disintegrate the same so that it may be broken up into small pieces which are removed through the large fitting opening 16 of the tank. The water will serve also to dissolve the glue of the form so that it may be removed from the inside of the tank without sticking.

The bladder type of fuel tank shown in the drawings is usually given a construction corresponding to the shape of the metal lined opening of the airplane in which the tank is to be used. The tank illustrated in Fig. 1 of the drawing is shown in Fig. 3 as installed in a wing section of an airplane. This tank consisting of the inner liner 17 and outer fabric covering 18 is confined within a metal casing 19 mounted within the airplane structure framework. This framework as shown consists of the lower channel structure 20 covered by the lower wing surface 21 and the upper channel structure 22 covered by the upper wing surface 23. The wing structure shown is provided with vertical stiffeners 24 adjacent the rear surface of the fuel tank, only one of which is shown in Fig. 3 but a number of these stiffeners are employed, and the rear wall of this tank is therefore shown in Fig. 1 as provided with the vertically disposed channels 25, which are shaped to conform to the stiffeners 24 and the distance between them. Additional stiffeners 24' are shown in Fig. 4, which is a horizontal section taken parallel to the wing skins 21 and 23 and illustrates a bulk-head 26 against which one wall of the tank of Fig. 1 may rest, and this tank is provided with the channels 25' adapted to fit the stiffeners 24'. It will be apparent that the complicated construction of the walls having the channels 25 and 25' could be eliminated by spanning the stiffeners 24 and 24' with metal sheets 19 such as are used to present smooth surfaces at the top and bottom of the tank, but this procedure cannot always be followed when it is necessary, as in the case of long range aircrafts, to use all the available space to carry fuel. A tank having these channels 25, 25' would be extremely difficult to make by the practice employed prior to the present invention, in which the tank body was formed by cutting a sheet of lining material to a pattern and fitting these rubber lining strips to the contour of the tank form, and then securing the seams together. This difficulty is avoided by using the seamless liner 17 of the present invention.

In order that the fuel tank 17, 18 may be introduced into the metal casing 19 of the plane, the lower wing surface 21 is provided with a removable section 27 through which the tank may be introduced after it has been collapsed, and after the tank has been introduced into the casing 19, a workman enters the opening 16 or reaches in through this opening, so that he may engage the female members 15 of the snap fasteners carried by the tank with the male snap fastener element 28 carried by the upper and side walls of the casing 19. After this has been done a closure plate is bolted in place as shown to close the opening 16.

When aromatic fuels are to be used in the tank, it is necessary to incorporate a plastic film or barrier in the Buna N wall to prevent diffusion of the fuel to the outside of the tank. Buna N rubber is satisfactory for confining aliphatic hydrocarbons, but the aromatic hydrocarbons have a slight solvent action upon this material, and for this reason a special barrier film is required. Polyamide plastic (one of the nylons) is commonly used for this purpose, although polyvinyl alcohol and polyvinylidene chloride are also sufficiently resistant to aromatic fuels for use as barriers. While the barrier materials just mentioned will alone form a satisfactory aromatic fuel container from the standpoint of the fuel resistance, they are expensive, stiff and otherwise unsatisfactory. Therefore, in the case of aromatic fuel tanks it is found desirable to provide a nylon barrier film 29 which is confined between Buna N films 30 and 31 as shown in Fig. 5 of the drawing.

When the barrier film is used, the film of Buna N cement is applied on the form as described above until it is about .005" to .007" thick, then one coat of adhesive to tie the Buna N film to the nylon barrier is applied, followed by two or three coats of nylon solution. The second coat of adhesive is then brushed over the nylon in order to adhere the two or three coats of Buna N cement which follows the nylon film. The Buna N coated fabric 18 is then adhesively bonded to the exterior of the liner as shown in Fig. 3.

The seamless liner of the present invention can also be used to advantage in self-sealing fuel tanks. Such tanks have a number of plies built up over the liner, including a semi-vulcanized rubber sealing compound which swells rapidly in the presence of the fuel, and fabric retaining plies to strengthen the tank walls and prevent excessive distortion. If the liner is not impervious to fuel, the fuel will attack the sealant layer, causing it to swell as much as 800 to 1000 per cent. of its original volume in 24 hours. Under such conditions the tank would soon disintegrate and release its fuel load. In the past lining seam failures have been responsible for a large percentage of the fuel tank failures. The seamless liner of the present invention therefore provides a decided advantage over the prior tank construction containing seamed liners.

In building a self-sealing tank with a seamless liner the cement is applied to the form in exactly the same manner as for the non self-sealing tanks above described. Care is taken to paint over the flanges of the molded fittings, which are used almost exclusively in the self-sealing cells, as cautioned above in regard to the tapes, gaskets and molded fittings of the non self-sealing or bladder cells. The nylon barrier is incorporated, if necessary, and the self-sealing rubber and fabric plies are added in successive layers over the seamless liner according to the conventional method.

While the seamless tank liner is above described as formed of Buna N, other types of rubber or rubber-like materials may be used depending upon the nature of the material to be confined in the tank. Appropriate cements which may be used to form the seamless liner 17 include rubber-like cements made from aqueous emulsion polymerizate of a conjugated diene and a mono olefine copolymerizable therewith, such as the copolymer of butadiene-1,3 and acrylonitrile (referred to throughout this specification as Buna N); aqueous dispersions of polychloroprene, known as neoprene latex; or aqueous dispersions of the so-called plastic materials, like polyvinyl chloride, copolymers of vinyl chloride and acetate, and polyvinylidene chloride. The cements may also be prepared by dispersing the solid forms of these same rubber-like materials in a suitable organic solvent. Some of the newer aircraft engines require fuels, not hydrocarbons, for which the rubber-like plastics are better adapted as a tank lining material than the "synthetic rubbers." Organic dispersions of polyamides, polyethylenes, and polyisobutylenes are plastic materials which have been found suitable in addition to those named with the group of aqueous plastic dispersions.

The liner forming material may be applied in successive films not only by brushing but also by spraying or by dipping although brushing is the preferred method. The cement must be thinned down to about 10% to 15% of the total solids content for spraying and greater care must be taken to lay down the cement evenly without trapping air. Dipping is a reliable method of coating the form with a lining cement, particularly if the form is small. In the case of large forms it has been found preferable to roll the partially submerged form in the cement. The rolling technique also produces a uniformly thick deposit over the surface of the form because it eliminates the running of the cement to the lower points.

Although the invention has been described in relation to flexible bladder or self-sealing cells of the collapsible type, it is not strictly confined to the flexible type. The seamless liner can be used in non-metallic rigid or semi-rigid tanks with the same improvements resulting over the prior art liners containing seams. Such tanks are built by depositing a liner on a hollow form as above described and then there is built up over this liner a backing such as a sealing layer, if a self-sealing tank is required, followed by external plies of rigid material, for example fabrick duck impregnated with a stiff plastic, vulcanized fiber, cyclized rubber, etc. As many of these outer plies are bonded to the liner or sealing layers as are required to obtain the desired degree of rigidity. These tanks are used as fuel containers in aircraft and other vehicles where the entrance to the space occupied by the tank is sufficiently large to accommodate the tank without collapsing the same.

It will be seen from the foregoing that a number of advantages are secured by providing fuel tanks with a seamless liner, in accordance with the present invention, instead of forming the liner of cut and fitted rubber strips as heretofore.

Having thus described my invention, what I claim and desire to protect by Letters Patent is:

1. The method of making a non-metallic tank to confine liquid fuel, which includes the steps of providing a hollow form having the shape to be imparted to the tank, covering the meeting edges of the form with an all-plastic tape about one hundredth of an inch thick and positioned to straddle the edges and made of highly plasticized butadiene-acrylonitrile copolymer rubber, depositing successive films of rubber cement over the form and tape to produce an all plastic fuel resistant seamless liner for the tank that bonds to the tape and forms a smooth inner face upon the liner where they meet, covering this liner with a strong protecting layer of sheet material bonded thereto, curing the rubber materials, and then freeing the form from the liner and collapsing the form so that it can be removed through an opening in the tank.

2. The method of making a flexible tank for volatile liquid hydrocarbons and providing the same with a seamless liner, which includes the steps of providing a form having the shape to be imparted to the tank, depositing while in a fluid condition several films of butadiene-acrylonitrile copolymer rubber from solvent solution over the form, and applying between two of said films an adhesive composition containing butadiene-acrylonitrile copolymer and a phenol-formaldehyde condensation resin as a highly effective closure for any pinholes in the butadiene-acrylonitrile copolymer rubber liner, thus forming a hydrocarbon resistant liner, covering this liner with a sheet of butadiene-acrylonitrile rubber coated fabric, curing the butadiene-acrylonitrile rubber, freeing the form from the liner and collapsing the form and removing it through an opening in the tank.

3. The method of making a non-metallic tank for liquid fuel having a seamless inner liner, which includes the steps of providing a hollow molding form having the shape to be imparted to the fuel tank, covering the meeting edges of the form with an all plastic tape about one hundredth of an inch thick and adhered thereto so as to straddle the edges and made of highly plasticized rubber material, depositing successive films of rubber cement over the form and tape to produce an all plastic fuel resistant liner for the tank in which the tape and films merge and provide added thickness at the edges, covering this liner with a strong protecting layer of sheet material, curing the rubber materials, and then freeing the form from the liner and collapsing the form and removing it through an opening in the tank.

ROBERT E. BAILEY.

REFERENCES CITED

The following references are of record in the file of this patent:

UNITED STATES PATENTS

| Number | Name | Date |
|---|---|---|
| 2,381,739 | Gray | Aug. 7, 1945 |
| 2,394,423 | Bell | Feb. 5, 1946 |
| 2,394,492 | Scharenberg | Feb. 5, 1946 |
| 2,401,625 | Eger | June 4, 1946 |
| 2,401,626 | Eger | June 4, 1946 |
| 2,416,231 | Smith et al. | Feb. 18, 1947 |
| 2,422,239 | Holt | June 17, 1947 |
| 2,426,384 | Blanchard | Aug. 26, 1947 |